United States Patent
Vadgaonkar et al.

(10) Patent No.: US 11,420,594 B2
(45) Date of Patent: Aug. 23, 2022

(54) CONFIGURABLE VARIABLE SWEEP VARIABLE SPEED WIPER SYSTEM

(71) Applicant: Goodrich Corporation, Charlotte, NC (US)

(72) Inventors: Prashant Vadgaonkar, Karnataka (IN); Guru Prasad Mahapatra, Karnataka (IN); Sujoy Khanra, Karnataka (IN); Pullaiah Dussa, Bangalore (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 560 days.

(21) Appl. No.: 15/872,537

(22) Filed: Jan. 16, 2018

(65) Prior Publication Data
US 2019/0061696 A1    Feb. 28, 2019

(30) Foreign Application Priority Data
Aug. 28, 2017    (IN) .............................. 201711030390

(51) Int. Cl.
*B60S 1/08*    (2006.01)
*B60S 1/26*    (2006.01)

(52) U.S. Cl.
CPC ........... *B60S 1/0807* (2013.01); *B60S 1/0814* (2013.01); *B60S 1/26* (2013.01)

(58) Field of Classification Search
None
See application file for complete search history.

(56) References Cited

U.S. PATENT DOCUMENTS

| | | | | |
|---|---|---|---|---|
| 4,663,575 A | * | 5/1987 | Juzswik | B60S 1/0807 318/443 |
| 4,705,997 A | * | 11/1987 | Juzswik | H02M 1/38 318/443 |
| 5,254,916 A | * | 10/1993 | Hopkins | B60S 1/0807 318/443 |

(Continued)

FOREIGN PATENT DOCUMENTS

| | | |
|---|---|---|
| DE | 102005013591 A1 | 9/2006 |
| DE | 102013209975 A1 | 12/2014 |

(Continued)

OTHER PUBLICATIONS

European Search Report for Application No./Patent No. 18190441.8-1015 dated Jan. 2, 2019; 7 pgs.

(Continued)

*Primary Examiner* — Russell Frejd
*Assistant Examiner* — Sara J Lewandroski
(74) *Attorney, Agent, or Firm* — Cantor Colburn LLP (57) ABSTRACT

A configurable windshield wiper system for a variable sweep angle and/or variable sweep speed. The system includes a bidirectional motor, a gearbox, the gearbox having and input shaft operably coupled to the motor and an output shaft; the gear box configured to ratiometrically step down the number of turns at its output shaft relative to its input shaft; a wiper arm for sweeping a surface of a windshield, the wiper arm operably coupled to an output of the gearbox; and a controller in operable communication with the motor, the controller configured to execute an algorithm to control the position and speed of the motor to achieve a configured sweep angle and configured sweep speed for the wiper arm.

8 Claims, 4 Drawing Sheets

(56) References Cited

U.S. PATENT DOCUMENTS

| | | | | |
|---|---|---|---|---|
| 5,384,526 | A * | 1/1995 | Bennett | G05B 11/42 388/906 |
| 6,768,099 | B1 * | 7/2004 | Cheng | B32B 17/10036 250/227.24 |
| 7,019,477 | B2 * | 3/2006 | Hospital | B60S 1/185 15/250.16 |
| 7,294,986 | B2 * | 11/2007 | Marentette | B60S 1/166 318/443 |
| 7,676,880 | B2 * | 3/2010 | Moein | H02K 11/215 310/156.01 |
| 10,232,824 | B2 * | 3/2019 | Giraud | B60S 1/524 |
| 2008/0216868 | A1 * | 9/2008 | Karcher | B60S 1/08 318/443 |
| 2009/0119864 | A1 * | 5/2009 | Mayer | B60S 1/0814 15/250.14 |
| 2010/0175216 | A1 * | 7/2010 | Natsume | B60S 1/08 318/447 |
| 2012/0227205 | A1 * | 9/2012 | Maier | B60S 1/08 15/250.12 |
| 2013/0093364 | A1 * | 4/2013 | Wegner | B60S 1/08 318/3 |
| 2013/0119911 | A1 * | 5/2013 | Karcher | B60S 1/08 318/474 |
| 2014/0013535 | A1 * | 1/2014 | Natsume | B60S 1/08 15/250.12 |
| 2015/0082575 | A1 * | 3/2015 | Kimura | B60S 1/166 318/400.14 |
| 2015/0166014 | A1 * | 6/2015 | Amagasa | B60S 1/0814 701/49 |
| 2017/0259788 | A1 * | 9/2017 | Villa-Real | B60R 1/0602 |
| 2017/0361810 | A1 * | 12/2017 | Ijima | B60S 1/08 |
| 2018/0111586 | A1 * | 4/2018 | Patel | B60S 1/26 |
| 2019/0009748 | A1 * | 1/2019 | Negi | B60S 1/18 |
| 2019/0016307 | A1 * | 1/2019 | Negi | G06V 20/56 |
| 2019/0061695 | A1 * | 2/2019 | Ijima | B60S 1/08 |
| 2019/0084528 | A1 * | 3/2019 | Herzinger | B60S 1/522 |
| 2019/0263359 | A1 * | 8/2019 | Ijima | B60S 1/08 |
| 2019/0337486 | A1 * | 11/2019 | Sugimoto | B60S 1/36 |
| 2020/0039470 | A1 * | 2/2020 | Shepherd | B60S 1/3404 |
| 2020/0079324 | A1 * | 3/2020 | Hase | G06T 7/12 |
| 2020/0198585 | A1 * | 6/2020 | Tanoue | B60S 1/52 |
| 2021/0402958 | A1 * | 12/2021 | Aoyama | B60S 1/546 |
| 2022/0032876 | A1 * | 2/2022 | Adachi | B60S 1/026 |

FOREIGN PATENT DOCUMENTS

| | | |
|---|---|---|
| DE | 102015217424 A1 | 3/2017 |
| EP | 2873568 A1 | 5/2015 |
| EP | 3141440 A1 | 3/2017 |
| FR | 3006271 A1 | 12/2014 |
| WO | 2017126526 A1 | 3/2017 |

OTHER PUBLICATIONS

European Office Action Application No. 18190441.8, dated Apr. 14, 2020; pp. 5.

* cited by examiner

CONFIGURABLE VARIABLE SWEEP VARIABLE SPEED WIPER SYSTEM

CROSS-REFERENCE TO RELATED APPLICATIONS

This application claims the benefit of India Application No. 201711030390 filed Aug. 28, 2017, which is incorporated herein by reference in its entirety.

TECHNICAL FIELD

Embodiments of the disclosure pertain to the art of windshield wiper systems, and in particular, a configurable, variable sweep angle, variable speed windshield wiper system.

BACKGROUND

Windshield wipers are used in a range of vehicles including automobiles, ships, spacecraft, and aircraft. In today's environment, wipers are used to increase the visibility and safety when conditions and precipitation obstruct a vehicle operator's view. Generally wipers have a fixed range for sweeping across the window of the vehicle. The fixed range of motion limits the compatibility with different types of vehicles having different size and shape of windshields. Some vehicles may require a larger sweep angle while others require a smaller sweep angle. Some vehicles may have large windows while others are equipped with small windows.

Present wiper technology commonly utilizes a Brushless Direct Current (BLDC) motor and a gear train with a crank-rocker convertor mechanism. The gear box is used to step down the motor speed and step up the torque at the wiper drive shaft. The rotary motion of the electric motor is converted into oscillatory motion at the drive shaft by the crank-rocker mechanism. Most mechanical systems are constant sweep angle and constant sweep speed mechanisms. A variety of design variants require hardware changes on the crank rocker mechanism to meet the specific sweep requirements for a given platform.

Some systems include variable sweep angles and speed in the wiper system. These systems include a wiper motor coupled to a wiper arm for sweeping a surface of a windshield through a mechanism with several eccentrics, and an indexable eccentric plate. The indexable eccentric plate is used to determine an offset of the wiper arm coupled to the first eccentric to control wiper sweep angle and speed. However, mechanical systems are not as dynamic, with less flexibility than a fully configurable system. Some electronic systems are more configurable and also include regulation and/or profiling of wiper arm speed where a desired/configureable interval corresponding with the preselected speed or speed profile is stored. A pulse-width modulation signal for effecting a speed and interval is employed, preferably with a relatively-low repetition rate. The wiper speed may be profiled to include acceleration and deceleration, and the intervals of acceleration and deceleration may be lengthened substantially to provide an apparent dwell. Some designs and platforms may require even more configurability and flexibility for a given platform, or across a variety of platforms.

BRIEF DESCRIPTION

Disclosed herein is configurable windshield wiper system for a variable sweep angle or variable sweep speed. The system includes a bidirectional wiper motor, a gearbox, the gearbox having an input shaft operably coupled to the motor and an output shaft; the gear box configured to ratiometrically step down the number of turns at its output shaft relative to its input shaft; a wiper arm for sweeping a surface of a windshield, the wiper arm operably coupled to an output of the gearbox; and a controller in operable communication with the motor, the controller configured to execute an algorithm to control the position and speed of the motor shaft to achieve a configurable sweep angle and configurable sweep speed for the wiper arm.

In addition to one or more of the features described above, or as an alternative, further embodiments may include that the motor is a brushless direct current motor.

In addition to one or more of the features described above, or as an alternative, further embodiments may include that the wiper arm is configured to sweep from a starting point to a reversing point thereby defining the sweep angle.

In addition to one or more of the features described above, or as an alternative, further embodiments may include a position or speed sensor in operable communication with a shaft of the motor, the controller being further configured to control the position and speed of the motor based on at least one of a position and a speed provided by the sensor.

In addition to one or more of the features described above, or as an alternative, further embodiments may include a position or speed sensor in operable communication with the output shaft of the gearbox, the controller being further configured to control the position and speed of the motor based on at least one of a position and a speed of the output shaft of the gearbox provided by the sensor.

In addition to one or more of the features described above, or as an alternative, further embodiments may include a sensor for detecting an operational characteristic of the vehicle in operable communication with the controller, the controller being further configured to control the position and speed of the motor based on the operational characteristic of the vehicle.

In addition to one or more of the features described above, or as an alternative, further embodiments may include that the sensor is an airspeed sensor and the vehicle operational characteristic is airspeed.

In addition to one or more of the features described above, or as an alternative, further embodiments may include; a second bidirectional motor, a second gearbox, the second gearbox having and input shaft operably coupled to the motor and an output shaft; wherein the gear box configured to step down the number of turns at its output shaft relative to its input shaft, a second wiper arm for sweeping a surface of a windshield, the second wiper arm operably coupled to an output of the second gearbox, and the controller in operable communication with the second motor, the controller configured to execute an algorithm to control the position and speed of the second motor to achieve a second sweep angle and second configured sweep speed for the second wiper arm.

In addition to one or more of the features described above, or as an alternative, further embodiments may include that at least one of the second configured sweep angle and second sweep speed for the second wiper arm are different than the configured sweep angle and configured sweep speed for the first wiper arm.

Also described herein in an embodiment is a method of controlling a windshield wiper assembly with configurable variable sweep angle or variable sweep speed in a vehicle. The method includes operably connecting a bidirectional motor in a vehicle wiper system, commanding an operation of the motor in a selected direction at a selected motor speed, the motor speed selected to achieve at least one of a configured wiper arm sweep speed and a configured sweep angle, and selecting at least one of a duration and a motor reversal position for end of sweep to achieve the configured sweep angle for the wiper arm. After at least one of the duration and reaching the motor reversal position, the method includes directing the motor in the opposite direction at another motor speed, the another motor speed selected to achieve another configured wiper arm speed, and repeating the commanding, selecting and directing. Finally, the method includes configuring at least one of the sweep angle, the sweep speed, the duration, the reversal position and the repeating.

In addition to one or more of the features described above, or as an alternative, further embodiments may include that the wiper arm has a configured starting point and reversal point thereby defining the sweep angle.

In addition to one or more of the features described above, or as an alternative, further embodiments may include controlling at least one of the position and speed of the motor based on a signal from a position or speed sensor in operable communication with a shaft of the motor, providing at least one of a position and speed of the shaft of the motor.

In addition to one or more of the features described above, or as an alternative, further embodiments may include controlling at least one of the position and speed of the motor based on a signal from a position or speed sensor in operable communication with the output shaft of the gearbox providing at least one of a position and speed of the output shaft.

In addition to one or more of the features described above, or as an alternative, further embodiments may include controlling the position and speed of the motor based on a signal from a sensor for detecting an operational characteristic of the vehicle.

In addition to one or more of the features described above, or as an alternative, further embodiments may include that the vehicle operational characteristic is airspeed sensed by an airspeed sensor.

In addition to one or more of the features described above, or as an alternative, further embodiments may include operably connecting a second bidirectional motor in a vehicle wiper system, commanding an operation of the second motor in a second selected direction at a second selected motor speed, the second motor speed selected to achieve at least one of a second configured wiper arm sweep speed and a second configured sweep angle, and selecting at least one of a second duration and a second motor reversal position for end of sweep to achieve the configured sweep angle for the wiper arm. After at least one of the second duration and reaching the second motor reversal position, the method may further include directing the second motor in the opposite direction at a third motor speed, the third motor speed selected to achieve a third configured wiper arm speed. In addition, the method may include repeating the commanding, selecting and directing as well as configuring at least one of the second configured sweep angle, the second configured sweep speed, the second duration, the second reversal position, and the repeating.

In addition to one or more of the features described above, or as an alternative, further embodiments may include that at least one of the second configured sweep angle, the second sweep speed for the second wiper arm, and the third sweep speed are different than the configured sweep angle and configured sweep speed for the first wiper arm.

In addition to one or more of the features described above, or as an alternative, further embodiments may include that at least one of the second configured sweep angle, the second configured sweep speed for the second wiper arm, and the third sweep speed are based on a velocity of a vehicle equipped with the wiper system.

In addition to one or more of the features described above, or as an alternative, further embodiments may include that at least two of the configured wiper arm speed, the another configured wiper arm speed, second configured wiper arm speed for the second wiper arm, and the third configured wiper arm speed are the same.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to configurable variable sweep angle, variable speed wiper system. The wiper system is configurable for a variety of parameters including sweep angle and speed as well as variable as a function of vehicle speed. The embodiments and disclosure are made with reference to an aircraft and helicopter application, however, they can also be applicable to other systems including, but not limited to, vehicles, airplanes, trucks, trains and the like, which rely on a wipers for clearing a windshield and are seeking improved performance over conventional systems. A detailed description of one or more embodiments of the disclosed system, apparatus, and method are presented herein by way of exemplification and not limitation with reference to the figures.

In one or more embodiments, systems, apparatuses, and methods for a configurable and variable sweep angle, variable speed wiper system are provided.

Having a fixed sweep angle may not be suitable for every application. The ability to obtain a variety of sweep angles without the need for custom manufactured parts increases the compatibility of the system with different vehicle and windshield types. A wiper system having a variety of configurations using common parts reduces assembly complexities for manufactures and costs for customers. Moreover, some customers may desire different configurations for different platforms and may desire variable configuration as a function of one or more vehicle operating parameters. In an embodiment, a software configurable drive system to adjust the sweep angle and speed on demand is provided so that a variety of sweep angles, speeds and functions can be realized.

Figure 1:
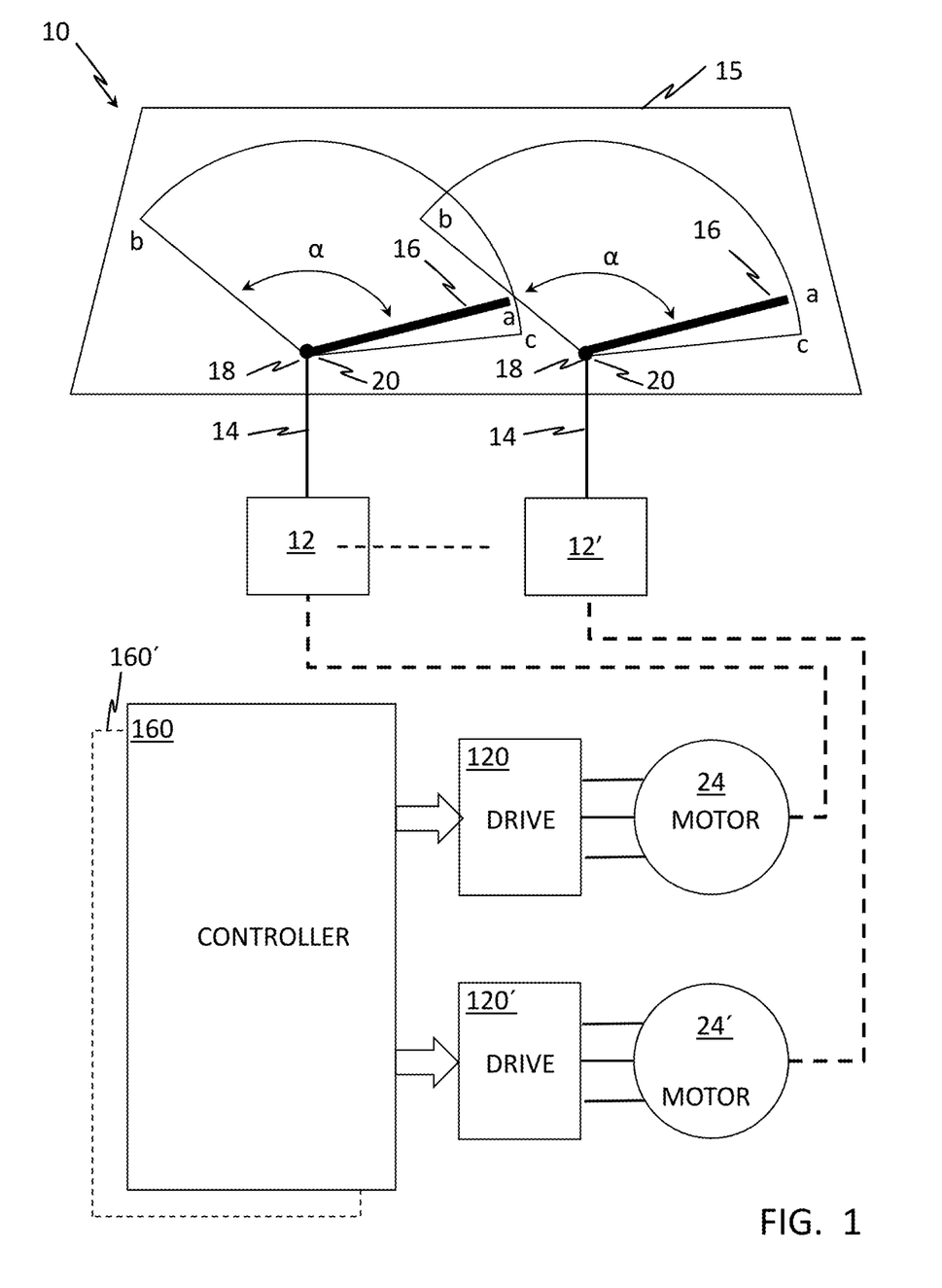
FIG. 1 depicts a simplified system of a vehicle windshield wiper system as employed in the embodiments.
Figure 2:
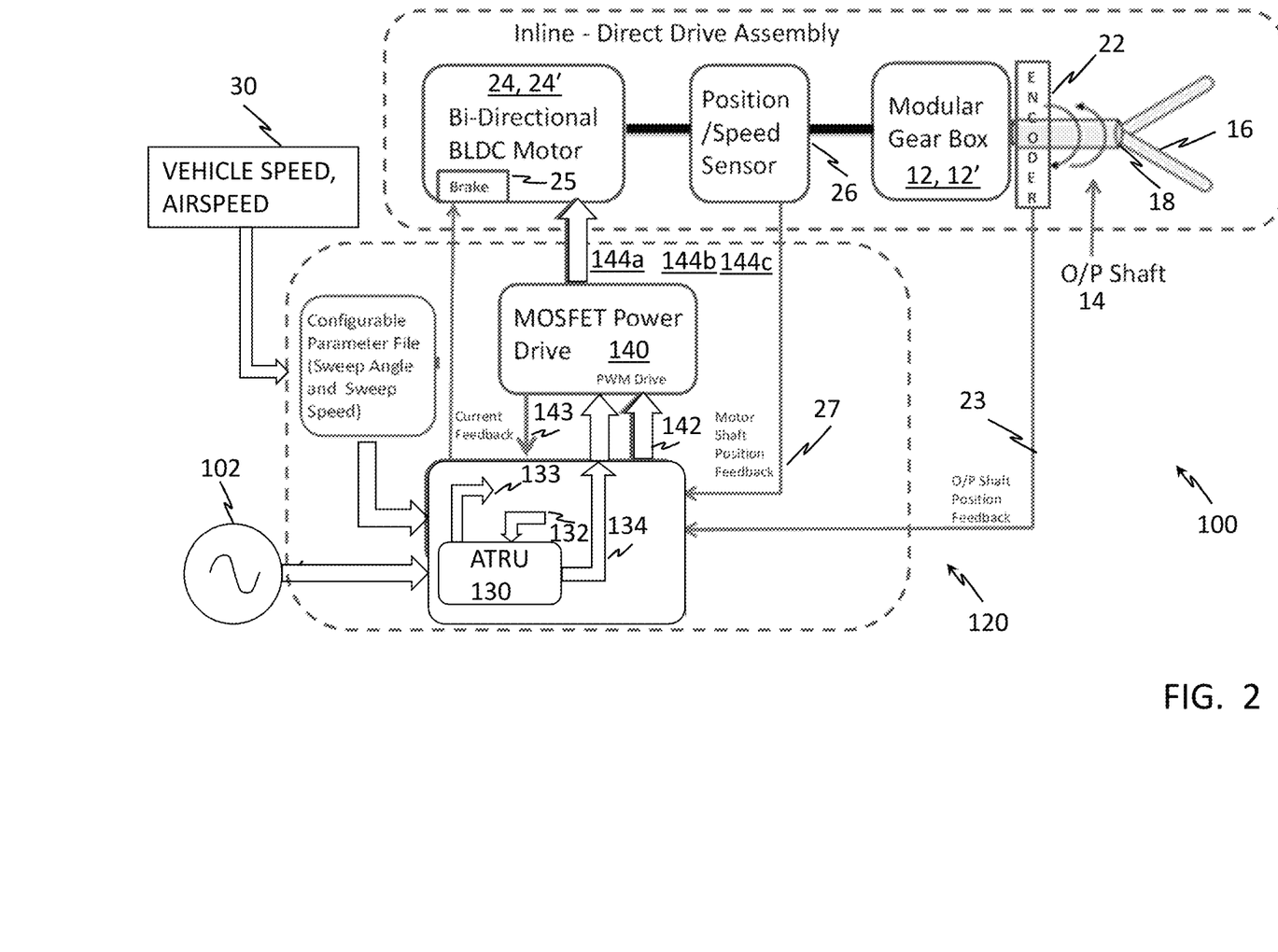
FIG. 2 depicts a simplified block diagram of a system architecture for the wiper system in accordance with an embodiment.

FIG. 1 illustrates a wiper system 10 for a software configurable drive system to adjust the sweep angle and speed on demand. Wiper system 10 includes motor 24 mechanically connected to a gear box 12 (12 and 12' shown for each wiper arm 16, but referred to generally as gearbox 12), each having a least a drive gear (not shown) and a driven gear (not shown). The gear box 12 is coupled to a shaft 14 and then to the wiper arm 16 on a pivot, 18. The pivot 18 may include a bearing mechanism as is known in the art, for example, in an embodiment, a ball bearing 20 is employed. In operation, as the motor 24 moves, in an oscillating (reversing) directions the motion is translated through the gear box 12, the shaft 14 to the wiper arm 16 and thereby cause the wiper arm 16 to sweep through a variable arc "α" on the windshield 15 from a first end of travel "a" to a second end of travel "b". In an embodiment, a speed/position sensor 22 (as shown in FIG. 2) may be employed to measure the position and/or speed of the wiper system 10 and in particular the wiper arm(s) 16. The speed/position sensor 22 may be on any variety conventionally employed.

For example, hall effect sensors, encoders, potentiometers, synchros, resolvers, rotary variable transducers, and the like. In some embodiments a sensor less position determining technique may be employed. The position and/or velocity of the motor wiper arm(s) 16 is provided to the controller 160 for processing as depicted on line 23. In an embodiment, the position and velocity information is utilized by the controller 160 to facilitate controlling the position of the motor 24, 24'. In addition, it may be possible for the wiper system 10 to include a parking position when the motor is and driven such that the wiper arm 16 move to a parking position c. In an embodiment, the wiper system 10 or motor 24, 24' may include a brake 25 (FIG. 2), and/or a braking function. For example, when the motor 24, 24' is not being commanded to move, the brake 25 and/or braking function may be engaged to ensure the motor 24, 24', and thereby the wiper arm 15 does not move. In an embodiment, a single motor 24 may be employed to drive both wiper arms 16. In another embodiment, two substantially independent systems are employed and each wiper arm 16 is controlled with a separate gearbox 12, 12'.

In one or more embodiments, the sweep angle can be integrated with the vehicle velocity. For example, during a heavy snow or rain a smaller sweep angle may be preferred over a larger sweep angle. In addition, while using the smaller sweep angle α faster speed for oscillating the wiper arm 16 may also be utilized. Vehicle velocity may be measured by one of more velocity sensors 30 including, but not limited to airspeed, ground speed, inertial or GPS determined speed and the like. In an embodiment vehicle airspeed is employed though other configurations are possible. In an embodiment, when the velocity of the vehicle, e.g., an aircraft, exceeds a configurable threshold, the wiper system will be operated to provide a smaller sweep angle α, and operated at a higher speed. Speed in this context can include wiper arm sweep speed and/or repetition rate. A signal can be supplied to control the motor 24, 24' to reduce the sweep angle α based on the vehicle/aircraft velocity. In another embodiment, while the vehicle is operated at a velocity less than the configurable threshold, the wiper system 10 will be operated to provide a larger sweep angle α, and a slower speed. In one or more embodiments, the speed of the wipers and the direction affecting the sweeping angles can be independently controlled by an operator.

FIG. 2 depicts a simplified block diagram of a power system 100 and a motor controller(s) or drive(s) 120 for controlling the motor 24, 24'. In an exemplary embodiment, the power system 100 includes an AC power source 102, such as an electrical main line (e.g., 115 Volts AC, 440 Volts AC, 1-phase or 3-phase, primary aircraft bus). The AC power source 102 is operably connected to the motor drive system 120 to provide excitation for the components of the wiper system 10. The AC power from the grid or AC power source 102 is converted to the DC power and then again inverted to the AC power of different frequency and different voltage level for operation of the motor 24, 24'. As described in further detail herein, drive system 120 includes a controller 160 including a rectifier or converter 130 labeled and hereinafter identified as ATRU (auto transformer rectifier unit) 130 to convert the AC power from the AC power source 102 to a DC voltage on a DC bus 134. In an embodiment, the ATRU 130 also includes a voltage level shifting function to change the AC voltage 102 to either a higher voltage or lower voltage. The higher voltage permits establishing a DC bus voltage at a higher voltage than the peak AC voltage of the AC power 102. In some applications the higher voltage is advantageous for motor control applications. In some applications, a lower voltage on the DC bus 134 is advantageous to reduce the stress on components in the drive 120. The level shifting function may be implemented by a transformer or conventional active techniques for level shifting. The ATRU 130 may also include a rectification function to convert the level shifted AC power to a DC voltage. In an embodiment the ATRU 130 employs an active rectifier to achieve the rectification function. The ATRU 130 can be an active or passive configuration and may include other functions and features such as active rectification, active or passive filtering for Electromagnetic Interference (EMI) and the like. The drive system 120 also includes a power drive or inverter 140, to convert the DC voltage on the DC bus 134 formulated by the ATRU 130 to multiphase, AC signals 144a, 144b, 144c to drive the motor 24, 24'. Drive signals 144a, 144b, 144c from the drive system 120 are supplied to the motor 24, 24' to operate the load e.g., wiper system 10. In an exemplary embodiment, motor 24, 24' includes a multiphase, permanent magnet motor, or more specifically a Brushless DC Motor (BLDC).

As shown in FIG. 2, the drive system 120 includes ATRU 130 and inverter 140 connected to provide drive signals 144a, 144b, 144c to motor 24, 24'. In an embodiment both the ATRU 130 and inverter 140 are controlled by a controller 160. In an alternative embodiment the ATRU 130 and the inverter 140 are controlled by a separate drive controller, 160 and 160', for separate motors 24 and 24' respectively. Drive controllers 160 (and 160') provide control signals 132 to the ATRU 130 to control operation of the ATRU 130 and generation of the DC voltage on the DC bus 134. In another embodiment, as shown in FIG. 2, the ATRU 130 is embedded with and integrated with the controller 160 (Shown in FIG. 3). The ATRU 130 may provide several sensor signals to the controller 160, 160' to facilitate level shifting the AC voltage from the AC power source 102 as well as rectification and generation of the DC voltage on the DC bus 134. The sensor signals 133 may include information of the active rectification in the ATRU and the switching devices as conventionally employed to facilitate the rectification. The sensor signals 133 may include, but not be limited to status of the switching devices, operation of the switching devices, temperature of the switching devices, and the like.

Likewise, the controllers 160 (and 160') provide control signals 142 to the inverter 140 to control generation of the drive signals 144a, 144b, 144c to motor 24, 24'. The inverter 140 may provide several sensor signals 143 to the controller 160, 160' to facilitate generation of the control signals 142 to the inverter 140 and ultimately the motor drive signals 144a, 144b, 144c. Sensor signals from the inverter 140 may include information of the operation of the switching devices employed to facilitate the pulse width modulation (PWM) generation of the motor drive signals 144a, 144b, 144c. Sensor signals 143 may include, but not be limited to status of the switching devices, operation of the switching devices, temperature of the switching devices, bus current, and the like. Drive controllers 160, 160' may be implemented using a general-purpose microprocessor executing a computer program stored on a storage medium (memory) to perform the operations described herein. Alternatively, drive controllers 160, 160' may be implemented in hardware (e.g., ASIC, FPGA) or in a combination of hardware/software.

Drive 120 and the ATRU 130 may further include an as a sensor signal an AC voltage monitor for measuring and monitoring the incoming AC voltage from the aircraft AC power source 102. The voltage monitor may be any variety of sensor operably connected to the controller 160, 160' or just a direct input to the controller 160, 160'. In an embodiment, the AC voltage monitor facilitates sensing open phases of the AC power source 102 and over/under voltage of the AC power source 102. Likewise drive 120 may further include a DC voltage monitor for measuring and monitoring the DC voltage for the DC bus 134. The DC voltage monitor may be any variety of sensor operably connected to the controller 160, 160' or just a direct input to the controller 160, 160'. In an embodiment, the DC voltage monitor facilitates sensing over/under voltage of the DC bus 134.

In addition, drive 120 may further include a DC Current monitor for measuring and monitoring the total DC current for the DC bus 134. The DC current monitor may be any variety of sensor or sensor operably connected to the controller 160, 160' or just a direct input to the controller 160, 160' for further processing. In an embodiment, the DC current monitor facilitates sensing over/under current circulating on the DC bus 134. Finally, drive 120 may further include an output or phase current monitor for measuring and monitoring the individual phase currents for the motor 24, 24'. The output current monitor may be any variety of sensor or sensors operably connected to the controller 160, 160' or just a direct input to the controller 160, 160' for further processing as shown by sensor signals 143. In an embodiment, the output current monitor facilitates sensing over current or imbalanced currents being supplied to the motor 24, 24'.

Continuing now with FIG. 2 for discussion of the operation of the motor drive 120. In a motor application, operating characteristics for the motor 24, 24' such as motor speed, torque, and the like, may be measured and provided to the controller 160 as a feedback signal. In an embodiment a speed/position sensor 26 is employed. The speed/position sensor may be on any variety conventionally employed. For example, Hall Effect sensors, encoders, potentiometers, tachometers, and the like. The position and/or velocity of the motor 24, 24' is provided to the controller 160 for processing as depicted on line 27. In an embodiment, the position and velocity information is utilized by the controller 160 to facilitate controlling the position of the motor 24, 24'.

In an embodiment, in operation, to control and drive the motor 24, 24', controller 160 generates voltage reference signal and compares it to the main power voltage feedback signal from the DC bus voltage monitor, to generate a voltage difference signal representative of the difference between them. A voltage feedback proportional-plus-integral (PI) control function is employed and receives the voltage difference signal and converts it to a stable control current reference. Likewise, a current comparator function in controller 160 compares the control current reference with the control current feedback signal to generate a current difference. A control current feedback PI controller function receives the current difference and converts it to a stable control current. A pulse width modulator (PWM) function receives the control current regulating signal and generates corresponding PWM control signals on a PWM control signals 142 to the inverter 140. The controller regulates the PWM control signals 142 to produce a level of the control current responsive to the voltage feedback and a control current feedback functions. In an exemplary embodiment, the controller 160 executes a method for controlling the position or speed of the motor 24, 24' as needed to control the sweep angle and speed of the wiper arms 16 as will be described further herein. Under normal operation, the inverter 140, based on the PWM control signals 142 generates phase excitation control signals 144a, 144b, 144c applied to the motor 24, 24'.

To that end, in an embodiment, the controller 160 executes a method 200 (See FIG. 4) of controlling the wiper system 10 operation and more particularly to precisely control the positioning and speed of the motor 24, 24' and thereby the wiper arm 16. In an exemplary embodiment, a control scheme is employed and a system architecture is implemented that includes proportional integral (PI) controlled bi-directional operation and control of the motor 24, 24'. Position/Speed sensor 26 at the motor 24, 24' and/or gear box 12, (12') is employed to produce variable sweep area/angle, sweep speed at the gear box output shaft 14 and ultimately drives the wiper arm 16 assembly as shown in FIG. 1. It should be appreciated that integral control is implemented with proportional control to facilitate reductions in the steady state error/offset that may otherwise be result with proportional control alone.

In operation, use of BLDC motor 24, 24' with bi-directional control, (i.e., use as a reversible motor), eliminates the conventional mechanical linkages and four bar mechanism of conventional wiper systems. In an exemplary embodiment, when controlled as described herein the motor 24, 24' rotates in a first direction and then is reversed after a selected number of revolutions, to operate in the opposite direction. The point of reversal (point "a" or "b" as shown no FIG. 1) of the motor direction depends on the desired/configurable sweep angle α, sweep speed, and the gear ratio of the gear box 12, 12'. For example, in one embodiment, the number of motor revolutions per reversal is equal to the sweep angle α multiplied by the gear ratio/360. Furthermore, the motor speed is equivalent to the external wiper speed multiplied by the gear ratio. The rotational angle control depends in part on the configuration and design of the motor 24, 24', more particularly, the number of poles in the motor 24, 24' and number of stop positions the motor 24, 24' can support. For example, considering an existing configuration of an 8 pole motor 24, 24 'with 24 stop positions, such a configuration would produce a position tolerance of 15 degrees at the shaft of the motor 24, 24'. This would then correspond to sweep angle tolerance of (15/gear ratio) of the gear box 12, 12'. Therefore, the gear ratio in the gearbox 12, 12' may be selected to achieve the desired/configurable motion. For example a gear ratio of 100 would result in a speed reduction of 100 and a resolution on wiper arm position of 0.15 degrees. It should be appreciated that the sweep speed in one direction may be different than in the other direction. That is, the sweep speed from "a" to "b" may be different than the sweep speed from "b" to "a". Moreover, in some embodiments multiple motors 24, 24', gearboxes etc. may be employed to drive multiple sets of wipers. In this case it should also be appreciated that the sweep speeds and sweep angle α for one motor 24, 24' may differ than those for another motor 24, 24'.

Figure 3:
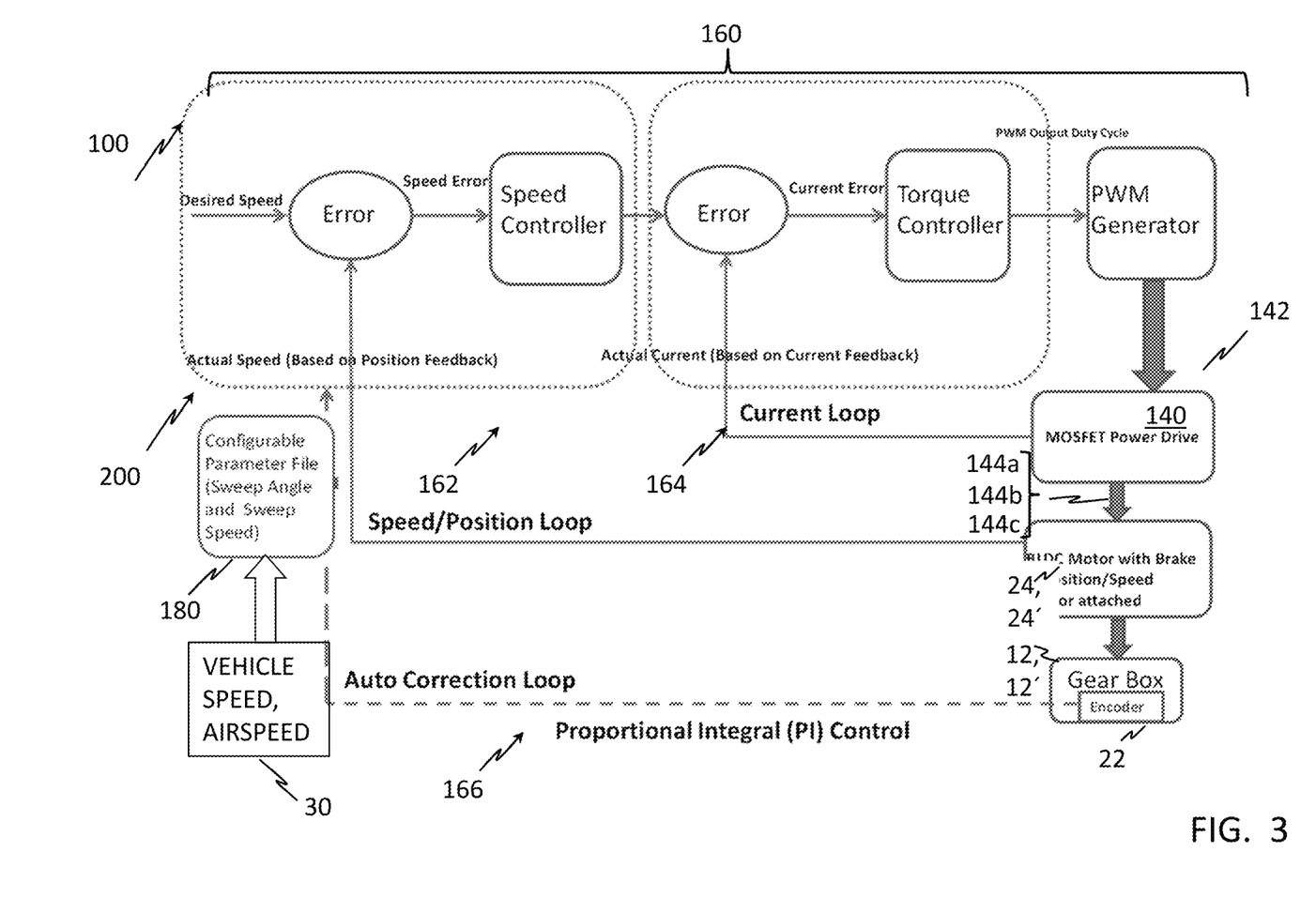
FIG. 3 depicts a simplified block diagram of a control loop and architecture for the wiper system in accordance with an embodiment.

Turning now to FIG. 3 as well, where a high level control block diagram is depicted for the wiper system 10. In an embodiment, the control loop may be executed as part of a methodology or process 200 (FIG. 4) in the controller 160, 160'. In an embodiment, as depicted in FIG. 3, two control loops are depicted. A speed/position feedback loop 162 and a current feedback loop 164 provides input to proportional integral controller to change the duty cycle of PWM pulses to achieve the desired/configurable speed for the motor 24, 24'. Reversal of the motor 24, 24' is achieved by reversing the commutation sequence of the motor drive via PWM control signals 142 to power drive circuit and inverter 140, and thereby changing the polarity and sequencing phase excitation control signals 144a, 144b, 144c applied to the motor 24, 24'. Motor speed depends on amplitude of the applied voltage. Amplitude of the applied voltage is controlled by a PWM technique and the voltage of the DC bus 134. For example, the difference between the actual and desired speed is input to speed controller (PI). Based on this difference, speed controller controls the duty cycle of PWM pulses in the control signals 142, which correspond to the voltage amplitude of required speed. Motor torque is directly proportional to current. Speed is held to the constant reference value for all load conditions until the full armature current is reached.

Current control loop 164 is implemented as a torque/current controller, which receives as input the speed command from the speed controller loop 162 and another as actual DC Bus current. The torque/current controller controls the duty cycle of PWM pulses. The torque control loop may also monitor the voltage or current of the DC bus 134 as well as the currents of the motor command signals 144a-c. Additional position feedback from the encoder or position sensor 22 attached at the gear box 12, 12' output end may be employed to measure the accurate/deviated sweep angle α at the wiper arm 16. Measurement at the actual wiper arm 16 may be desirable because this parameter may be influenced by, mechanical component tolerances, wear and tear, deflections, hysteresis, and the like, over long life usage of the wiper system 10. This measured gear box position feedback may also be utilized for the inflight/inservice autocorrection of the sweep area/angle α, using same control algorithms 16. The algorithm will estimate the error from the position sensor connected on gear box with reference to set sweep area/angle α and revise the set sweep area/angle as α+/− an ERROR. This further leads to the correction/adjustment of the PWM for getting the desired auto corrected sweep area/angle.

When the motor 24, 24' is commanded to stop, typically the excitation signals 144a, 144b, 144c are removed and a power off brake 25 (FIG. 2) is applied to hold the motor 24, 24' in the last commanded position. However, because of the electromagnetic energy and kinetic energy in the motor 24, 24', the motor 24, 24' will continue to when deactivated and coast pushing electromagnetic energy back to the drive 120 and DC bus 134 (until the power off brake 25 arrests the motion of the motor 24, 24' or all the electromagnetic energy in the motor 24, 24' is dissipated through the inverter 140 and DC bus 134 as well any other components of the drive 120. This dissipation takes time and actuation of the power off brake 25 also takes time to arrest the motion of motor 24, 24'. In another embodiment, to address this concern, regenerative braking may be employed to aid in controlling the positioning of the motor 24, 24' more accurately when desired.

As shown in FIG. 3, configurable parameter file 180 may be employed to facilitate the configurability of the wiper system and its control. In particular varying the sweep angle α and sweep speed, repetition rate and so on for the wiper system 10. In an embodiment the configurable parameter file 180 may reside in a separate FLASH memory or into the on chip flash memory of the embedded controller/processor 160 which operating as the motor controller 160. Based on the configurable parameters of sweep angle α and speed, the position and speed control loop 162 may take selected actions to modify the operating characteristics of the wiper system 10. For example, in an embodiment, control loop gain & response time for both speed control loop 162 and current control loop 164 may be modified to change the operating characteristics of the system 10. As a result, the output of the control will drive the PWM pulses of the control signals 132 with desired duty cycle to achieve the newly configured sweep angle α and sweep speed. Moreover, the wiper system may include onboard variable sweep control to permit variations in the operation of the system 10 by the user or operator. Variable sweep control onboard, i.e., when aircraft is in operation may be achieved using interfaces from the aircraft or vehicle. Such interfaces can include, but not be limited to a communication bus, (e.g., ARIC429 or CAN) which provides the true air speed from relevant vehicle systems 30 wiper system 10. Sweep angle α and speed control logic may be employed with the control loop 162 to map the desired sweep angle and/or speed with air speed, ground speed and the like. Configurable parameter file 180 may include a preselected set of vehicle speeds and respective sweep angle as lookup table burned into the memory. In another embodiment a schedule of constraints may be provided for scheduling sweep angle and sweep speed as a function of vehicle configuration, e.g., type of vehicle, model and the like; vehicle operating parameters such as mode, airspeed, ground speed, and the like; as well as configurations of the wiper system 10. Employing the lookup table data and knowing the air speed information, the control loops 162, 164 of the controller 160 will identify the desired sweep angle at various vehicle speeds, e.g., aircraft air speed. Thus, controller 160 will control the sweep angle α on board based on various vehicle speeds.

Figure 4:
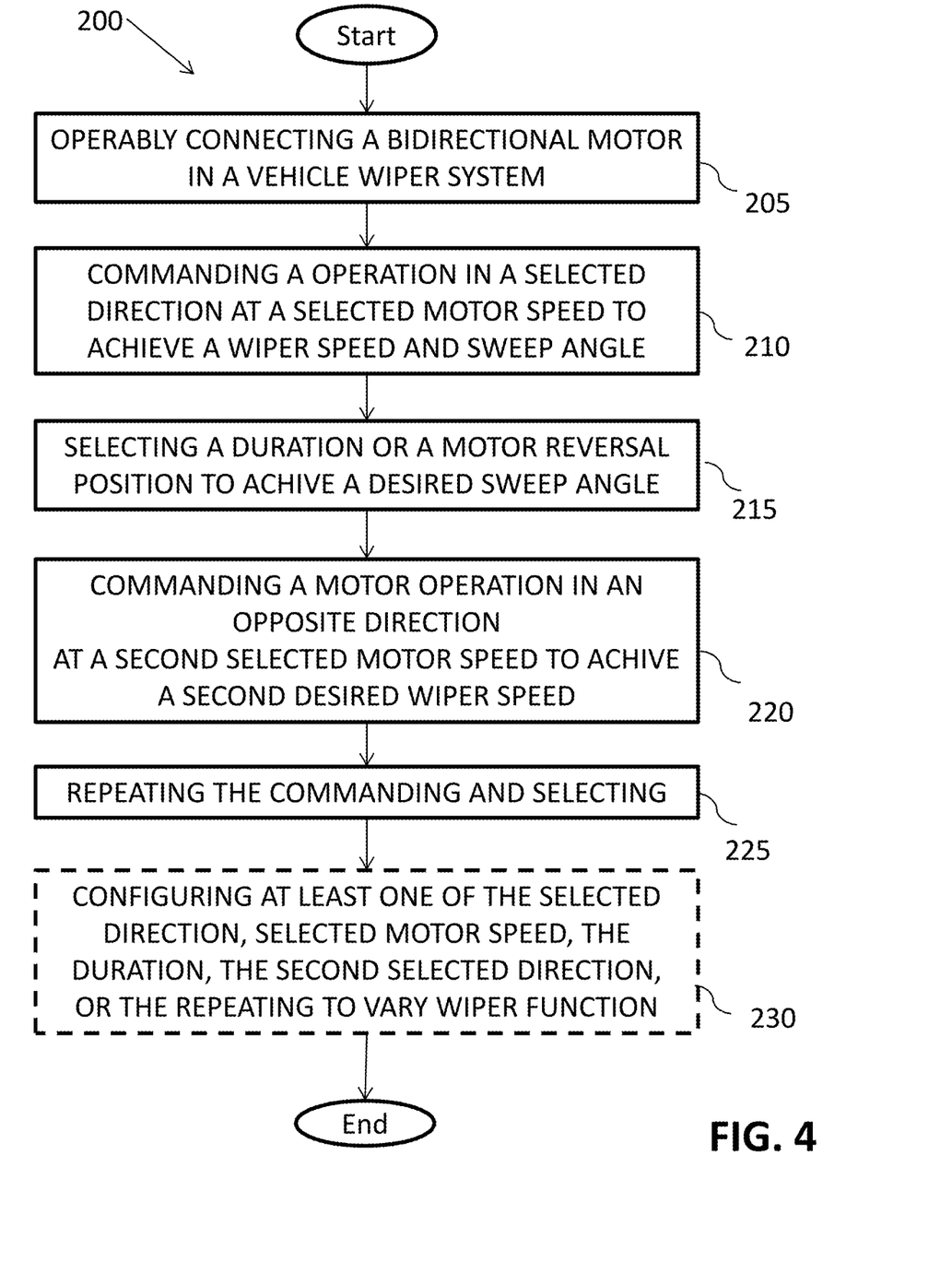
FIG. 4 is a flowchart of methods of operating a configurable variable speed or variable sweep angle wiper system in accordance with an embodiment.

Turning now to FIG. 4, a description of the methodology 200 of configurable control of a wiper system 10 in accordance with an embodiment is provided. The method initiates at process step 205 with operably connecting a bidirectional motor 24, 24' in a vehicle wiper system 10. At process step 210 the method 200 includes commanding an operation of the motor 24, 24' in a selected direction at a selected motor speed. The motor speed is selected to achieve a desired wiper arm 16 sweep speed and sweep angle. After a selected duration or motor reversal position from position sensor, the motor 24, 24' is commanded in the opposite direction at a second desired motor speed, once again to achieve a second desired wiper arm 16 speed as depicted at process step 220. The second desired wiper arm 16 speed in second direction may be same or different than the first desired wiper arm 16 speed in first direction. The selected duration or motor reversal position from position sensor is selected to achieve the desired sweep angle α as well as the desired start and stop points "a", "b" for the wiper arm 16 motion as shown at process step 215. Process step 225 includes repeating the commanding steps 210, 220, and the selecting step 215 to define the sweep angle. For example, repeating the sweep every second, every two seconds and so on to provide an intermittent functionality. Finally, at optional process step 230, the selected direction, motor speed, second selected motor speed and interval of the repeating may be configured to vary the function of wiper system 10. For example, one or more of these parameters may be varied for different vehicles, or vehicle characteristics. In an embodiment one or more of these parameters is varied as a function of the vehicle airspeed. For example, providing higher sweep speeds and/or shorter sweep angles as a function of vehicle airspeed, type of precipitation and the like.

In general, technical features of the embodiments herein relate generally to configurable variable sweep angle, variable speed wiper system. The wiper system 10 is configurable for a variety of parameters including sweep angle α and speed as well as variable as a function of vehicle speed. The ability to obtain a variety of sweep angles without the need for custom manufactured parts increases the compatibility of the system with different vehicle and windshield types. Moreover, customization functions facilitate providing customers a variety of configurations for different platforms and vehicle operating parameters. Moreover, the auto configurability permits autocorrected sweep range to account for variations in components over the service life of the wiper system 10.

Other benefits and advantages of the described embodiments include software and remote configuration capability, including minimal or no hardware changes for application to other platforms, improving development time with less cost. The system also facilitates tight, close control on sweep angle tolerances and limits. Another feature of the described embodiments is power savings at high vehicle speeds by onboard change to lower sweep range (onboard variable sweep) as well as torque sensing and control with the speed and current control loops 162 and 164.

The terminology used herein is for the purpose of describing particular embodiments, only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A configurable windshield wiper system for a vehicle having a variable sweep angle or variable sweep speed, the system comprising:
   a bidirectional motor;
   a gearbox, the gearbox having an input shaft operably coupled to the motor and an output shaft, wherein the gear box is configured to step down the number of turns at its output shaft relative to its input shaft;
   a wiper arm for sweeping a surface of a windshield, the wiper arm operably coupled to the output shaft of the gearbox; and
   a controller in operable communication with the motor, the controller configured to execute an algorithm to control the position and speed of the motor so as to perform the steps of:
   achieving a first sweep angle and a first sweep speed in a first direction;
   achieving a second sweep speed in a second direction, opposite of the first direction, wherein the second sweep speed is different from the first sweep speed;
   modifying the first sweep angle to be a second sweep angle different from the first sweep angle; and
   repeating the achieving steps using the modified first sweep angle.

2. The system of claim 1, wherein the motor is a brushless direct current motor.

3. The system of claim 1, wherein the wiper arm is configured to sweep from a first starting point to a first reversing point thereby defining the first configured angle and from the reversing point as a second starting point to a second reversing point different from the first reversing point thereby defining the second sweep angle.

4. The system of claim 1, further including a position or speed sensor in operable communication with a shaft of the motor, the controller being further configured to control the position and speed of the motor based on at least one of a position and a speed provided by the sensor.

5. The system of claim 1, further including a position or speed sensor in operable communication with the output shaft of the gearbox, the controller being further configured to control the position and speed of the motor based on at least one of a position and a speed of the output shaft of the gearbox provided by the sensor.

6. The system of claim 1, further including a sensor for detecting an operational characteristic of the vehicle in operable communication with the controller, the controller being further configured to control the position and speed of the motor based on the operational characteristic of the vehicle.

7. The system of claim 6, wherein the sensor is an airspeed sensor and the vehicle operational characteristic is airspeed.

8. The system of claim 1, further including:
a second bidirectional motor;
a second gearbox, the second gearbox having and input shaft operably coupled to the motor and an output shaft; wherein the gear box configured to step down the number of turns at its output shaft relative to its input shaft;
a second wiper arm for sweeping a surface of a windshield, the second wiper arm operably coupled to an output of the second gearbox; and
the controller in operable communication with the second motor.

\* \* \* \* \*